United States Patent
Liu et al.

(10) Patent No.: US 8,290,020 B2
(45) Date of Patent: Oct. 16, 2012

(54) FREQUENCY SELECTION METHOD TO MITIGATE IN-BAND INTERFERENCE FROM INTER-MODULATION SPUR OF THE COLLOCATED RADIO TRANSMITTER

(75) Inventors: Hsin-Yuo Liu, San Jose, CA (US); Leora Roth, Raanana (IL); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 12/485,833

(22) Filed: Jun. 16, 2009

(65) Prior Publication Data
US 2010/0316089 A1    Dec. 16, 2010

(51) Int. Cl.
*H04B 1/00* (2006.01)

(52) U.S. Cl. ........ 375/133; 375/130; 375/132; 375/135; 375/136; 375/219; 375/220; 375/295; 375/316; 370/272; 370/273; 370/276; 370/297; 370/320; 370/329; 370/335; 370/342; 370/431; 370/441; 370/464; 455/39; 455/41.2; 455/62; 455/63.1; 455/73; 455/76; 455/91; 455/130; 455/114.2

(58) Field of Classification Search .................. 375/130, 375/132, 133, 135, 136, 219, 220, 295, 316; 370/272, 273, 276, 297, 320, 329, 335, 342, 370/431, 441, 464, 479; 455/39, 41.2, 62, 455/63.1, 73, 76, 91, 114.2, 130
See application file for complete search history.

(56) References Cited

U.S. PATENT DOCUMENTS

| 6,307,896 | B1 * | 10/2001 | Gumm et al. ................. 375/316 |
| 7,184,724 | B1 * | 2/2007 | Ashby et al. ................. 455/130 |
| 2003/0171100 | A1 * | 9/2003 | Petersson et al. ............. 455/141 |
| 2004/0263378 | A1 * | 12/2004 | Jossef et al. .................... 342/20 |
| 2007/0047669 | A1 | 3/2007 | Mak et al. |
| 2008/0181337 | A1 | 7/2008 | Maxim |
| 2008/0248770 | A1 | 10/2008 | Schultz et al. |
| 2009/0023404 | A1 | 1/2009 | Leinonen et al. |

FOREIGN PATENT DOCUMENTS

| WO | 2010/147712 A2 | 12/2010 |
| WO | 2010/147712 A3 | 2/2011 |

OTHER PUBLICATIONS

International Search Report and Written Opinion received for PCT Patent Appliaction No. PCT/US2010/034034, mailed on Dec. 16, 2010, 8 Pages.
International Preliminary Report on Patentability received for PCT Application No. PCT/US2010/034034, issuance on Dec. 16, 2011, 4 pages.

* cited by examiner

*Primary Examiner* — Leon Flores
(74) *Attorney, Agent, or Firm* — Carrie A. Boone, P.C.

(57) ABSTRACT

A radio transmitter select its operating frequency based on the frequency characteristics of a collocated receiver and clock harmonics. The radio transmitter can dynamically change its operating frequency in a wide enough range so as to avoid frequencies where its spurs fall on the receive frequency of the collocated receiver. The frequency characteristics of the clock harmonic of the radio transmitter and the collocated receiver are obtained, then a range of operating frequencies is calculated to enable the collocated devices to operate without undue interference.

19 Claims, 10 Drawing Sheets

FREQUENCY SELECTION METHOD TO MITIGATE IN-BAND INTERFERENCE FROM INTER-MODULATION SPUR OF THE COLLOCATED RADIO TRANSMITTER

TECHNICAL FIELD

This application relates to collocated radio devices and, more particularly, to a mechanism by which such devices may simultaneously and successfully operate.

BACKGROUND

In telecommunications, collocation is a physical arrangement in which two objects are placed close together. Collocation may occur between two pieces of radio equipment, for example. On a collocated multiple-radio platform, adjacent or alternate channel interference among heterogeneous radio devices has become an issue of concern. A transmitted signal from one radio may leak into a collocated radio and cause degradation in the performance of its receiver. The object in which degradation occurs is known herein as the victim, e.g., victim radio, victim transmitter, or victim receiver. The typical co-existence transmitter-to-receiver interference scenarios are transmitter noise at the channel frequency of the receiver and receiver blocking by the collocated transmitter.

Transmitter noise is due to out-of-band (OOB) emission from imperfect filtering or phase/LO (local oscillator) noise in the transmitter. Transmitter noise may take the form of colored noise, white noise or spurs. Receiver blocking is due to several mechanisms, such as compression of the receiver, cross modulation between the receiver and the transmitter's leakage signal, limited dynamic range of an analog-to-digital (A/D) converter in the receiver, reciprocal mixing, and so on.

Clock signals are typically characterized as digital square wave pulses, with sharp edges that contain significant spectral energy. The spectral energy produces harmonic frequency components, hereinafter called harmonics, at frequencies that are integer multiples of the frequency of the clock signal. The harmonics may radiate from lines carrying the clock signal, which interconnect the logic circuitry. The harmonics may inter-modulate with one radio's transmission signals, to generate interference in the other radio's frequency band.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel approach to address the transmitter inter-modulation spur problem is disclosed. Using this novel method, a radio transmitter is allowed to select its operating frequency based on the frequency characteristics of a collocated victim receiver and clock harmonics. In some embodiments, a Bluetooth radio transmitter selects its operation frequency based on the frequency characteristics of a WiMAX receiver and clock harmonics. WiMAX, short for worldwide interoperability for microwave access, is currently defined by the IEEE (Institute of Electrical and Electronics Engineers) 802.16-series specification.

Figure 1:
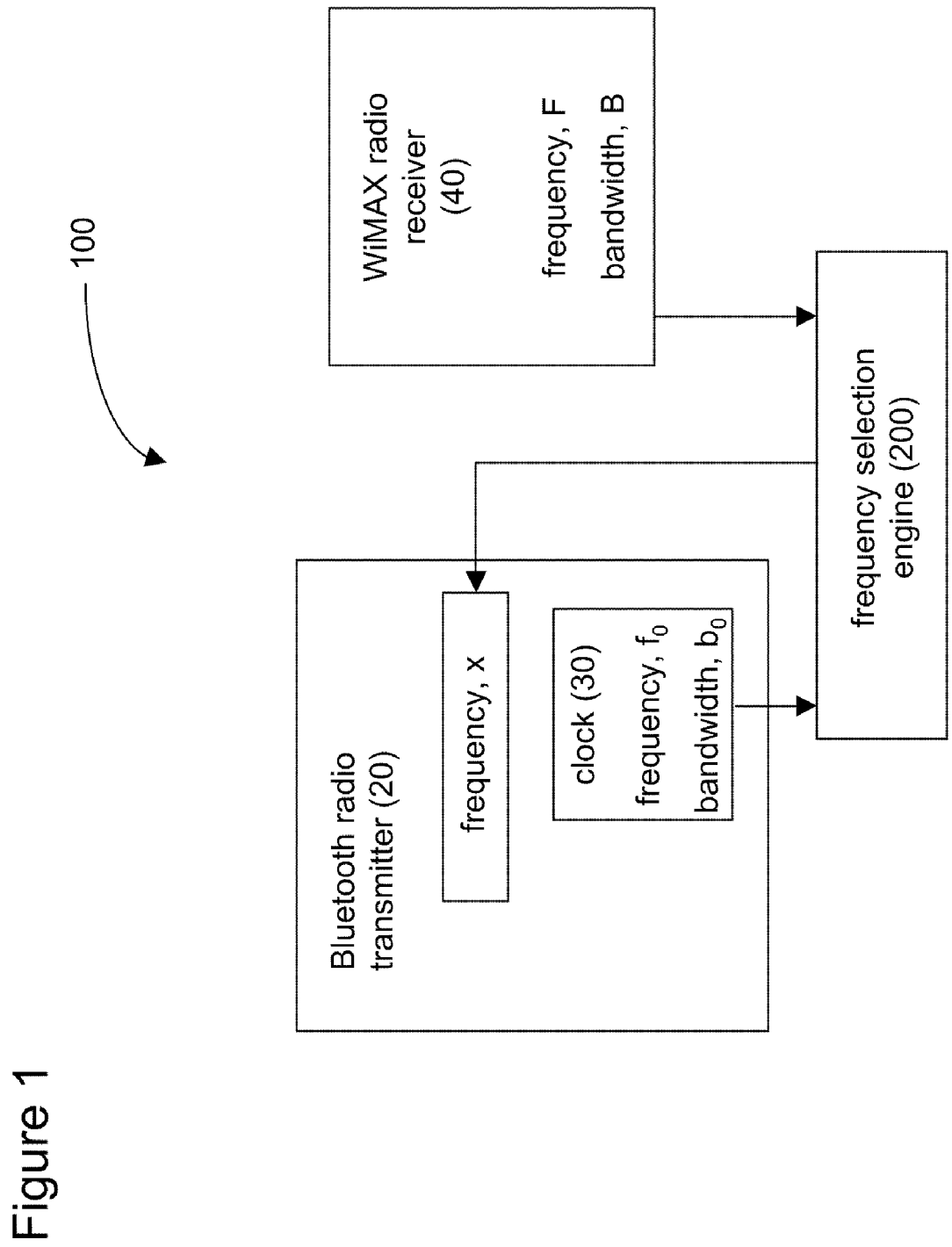
FIG. 1 is a block diagram of a system having two collocated devices and a frequency selection engine, according to some embodiments.

A system 100 having a Bluetooth radio transmitter 20 and a collocated WiMAX receiver 40 is depicted in FIG. 1, according to some embodiments. The Bluetooth radio transmitter 20 includes a clock 30, which generates harmonics. (The Bluetooth radio transmitter 20 operates as a transmitter and a receiver, but, for simplicity, is referred to herein as a transmitter.) A frequency selection engine (FSE) 200 takes the clock 30 frequency and bandwidth as well as the receiver 40 frequency and bandwidth, to determine an operating frequency of the transmitter 20. Detailed operation of the frequency selection engine 200 is illustrated in the flow diagrams of FIGS. 2 and 8, below. The frequency selection engine 200 may be implemented in software, hardware, or a combination of software and hardware. Before describing how the FSE 200 operates on the system 100, some background is presented.

The frequency selection engine 200 or frequency selection method is suitable in those systems in which the aggressor transmitter can dynamically change its operating frequency in a wide enough range, so that the transmitter can avoid frequencies where its spurs fall on the receive frequency of a collocated victim receiver. Although there are other types of aggressor transmitters, transmitters that feature frequency-hopping spread spectrum (FHSS) transmissions are good candidates for the frequency selection method 200. FHSS is a method of transmitting radio signals by switching a carrier among many frequency channels, using a pseudo-random sequence known to both the transmitter and the receiver. Bluetooth transmitters employ the FHSS technique. In FIG. 1, the Bluetooth radio transmitter 20 is the aggressor transmitter and the WiMAX radio receiver 40 is the collocated victim receiver. Likewise, transmitters that do not perform FHSS, such as fixed operating frequency transmitters, may be good candidates for the FSE 200, as long as the transmitter has a wide range of selectable frequencies/channels.

Suppose x indicates the operation frequency of a radio transmitter, and $f_k$ and $b_k$ indicate the lowest frequency and bandwidth, respectively, of the $k^{th}$ order clock harmonic.

Usually, $f_k$ is equal to $k f_0$, where $f_0$ is the frequency of the clock signal, and $b_0$ is the bandwidth of a clock harmonic. The frequency selection engine 200 assumes that clock harmonics have the same bandwidth. If their bandwidth is different, $b_0$ is set to the maximum of all the harmonics, in some embodiments.

From these assumptions, a second order inter-modulation frequency range is obtained as:

$$[x+kf_0, x+kf_0+b_0] \& [x-kf_0-b_0, x-kf_0] \text{ for } k=\{1,2,\dots\} \quad (1)$$

If the lowest frequency of the victim receiver is F and the bandwidth is B, such that its signal ranges are between F and F+B, a collocated transmitter should only be operated in the following ranges to completely avoid the second order inter-modulation interferences due to clock harmonics: where receiver frequency is smaller than the transmitter frequency:

$$\{x<F+f_0\},$$

$$\{F+B+(k-1)f_0+b_0<x<F+kf_0, (k>1)\}, \quad (2a)$$

where receiver frequency is greater than the transmitter frequency:

$$\{F+B-kf_0<x<F-b_0-(k-1)f_0, (k>1)\},$$

$$\{F+B-f_0<x\} \quad (2b)$$

Figure 2:
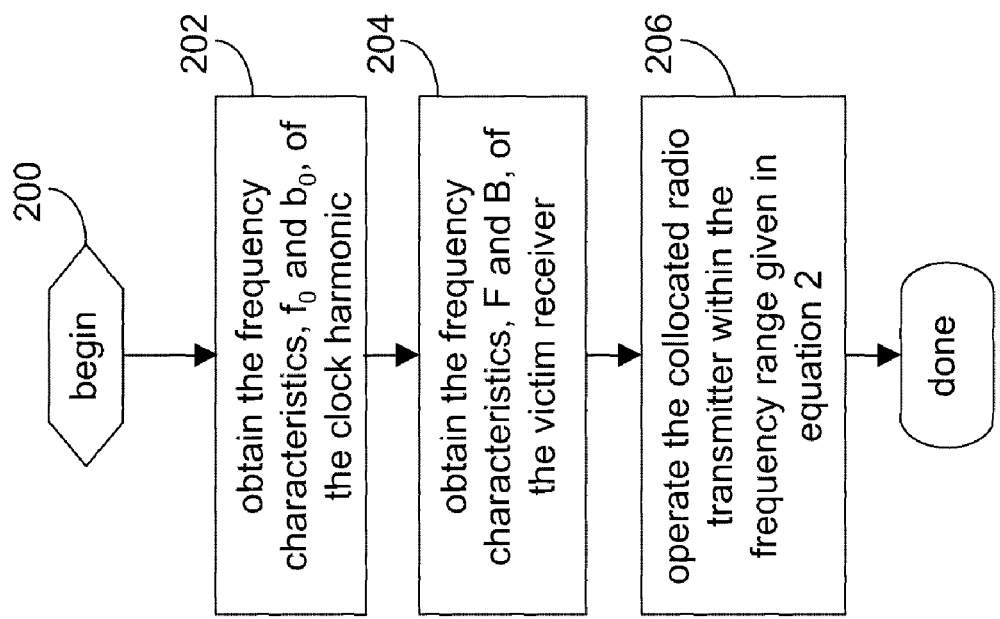
FIG. 2 is a flow diagram illustrating operations performed by the frequency selection engine of FIG. 1, according to some embodiments.

In some embodiments, the frequency selection engine 200 uses equations 2a or 2b, as appropriate (collectively, "equation 2") in selecting the operating frequency of the Bluetooth radio transmitter 20 (FIG. 1), as indicated in the flow diagram of FIG. 2. First, the frequency selection engine 200 obtains the frequency characteristics ($f_0$ and $b_0$) of the clock harmonic (block 202) of the Bluetooth radio transmitter 20. The FSE 200 also obtains the frequency characteristics (F and B) of the victim receiver (block 204), in this case, the WiMAX receiver 40. The above operations may be performed in reverse. From the information, the FSE 200 uses equation 2, above, to calculate x, a range of operating frequencies of the Bluetooth radio transmitter 20 (block 206), thus enabling the collocated devices to operate without undue interference.

For example, suppose the Bluetooth radio transmitter 20 of FIG. 1 has a 32 MHz internal clock 30, and the collocated WiMAX radio receiver 40 operates at 2508 MHz. WiMAX operates over a 10 MHz spectrum, so the operating range is between 2503 and 2513 (2508±5), so F=2503 (the lowest operating frequency of the WiMAX device). Further, $f_0=32$, $b_0=1$, and B=10. Solving for x in equation 2b, the Bluetooth radio transmitter 20 is determined to be operable at between 2402-2406 MHz (k=4), 2417-2438 MHz (k=3), or 2449-2470 MHz (k=2) to satisfy equation 2b and avoid interfere with the WiMAX radio receiver 40. (Where k=4, equation 2b results in an operating range of 2385-2406 MHz, but since the Bluetooth transmitter 20 operating range is 2402-2480 MHz, the lower end of the operating range is limited.) In FIG. 2, the FSE 200 provides a range of suitable operating frequencies for the Bluetooth transmitter 20, enabling the device to collocate with the WiMAX receiver 40.

As another example, suppose the Bluetooth radio transmitter 20 of FIG. 1 has a 32 MHz internal clock 30, and the collocated WiMAX radio receiver 40 operates at 2350 MHz. WiMAX operates over a 10 MHz spectrum, so the operating range is between 2345 and 2355 (2350±5), so F=2345 (the lowest operating frequency of the WiMAX device). Further, $f_0=32$, $b_0=1$, and B=10. Solving for x in equation 2a, the Bluetooth radio transmitter 20 is determined to be operable at between 2402-2409 MHz (again, this range is limited by the operating range of the Bluetooth transmitter), 2420-2441 MHz, or 2452-2473 MHz to satisfy equation 2a and avoid interfere with the WiMAX radio receiver 40. Either equation 2a or equation 2b may be used to solve for a range of usable frequencies. One of the equations may select a range of frequencies outside of the operating range of the transmitter. Under such circumstances, the other equation is instead used.

In a detailed case study of collocated Bluetooth and WiMAX radio transmitters, it is found that clock leakage inter-modulating with the transmitted signal may cause transmitter spurs, which may happen at both side of the transmitting frequency. The transmission power of these spurs, although much higher than the noise floor, is still below the spectrum mask imposed by the regulatory requirement. Chip/board designers do not want to spend extra effort and money to remove the transmitter spurs, since multi-radio operation is usually not part of the design considerations.

Figure 3:
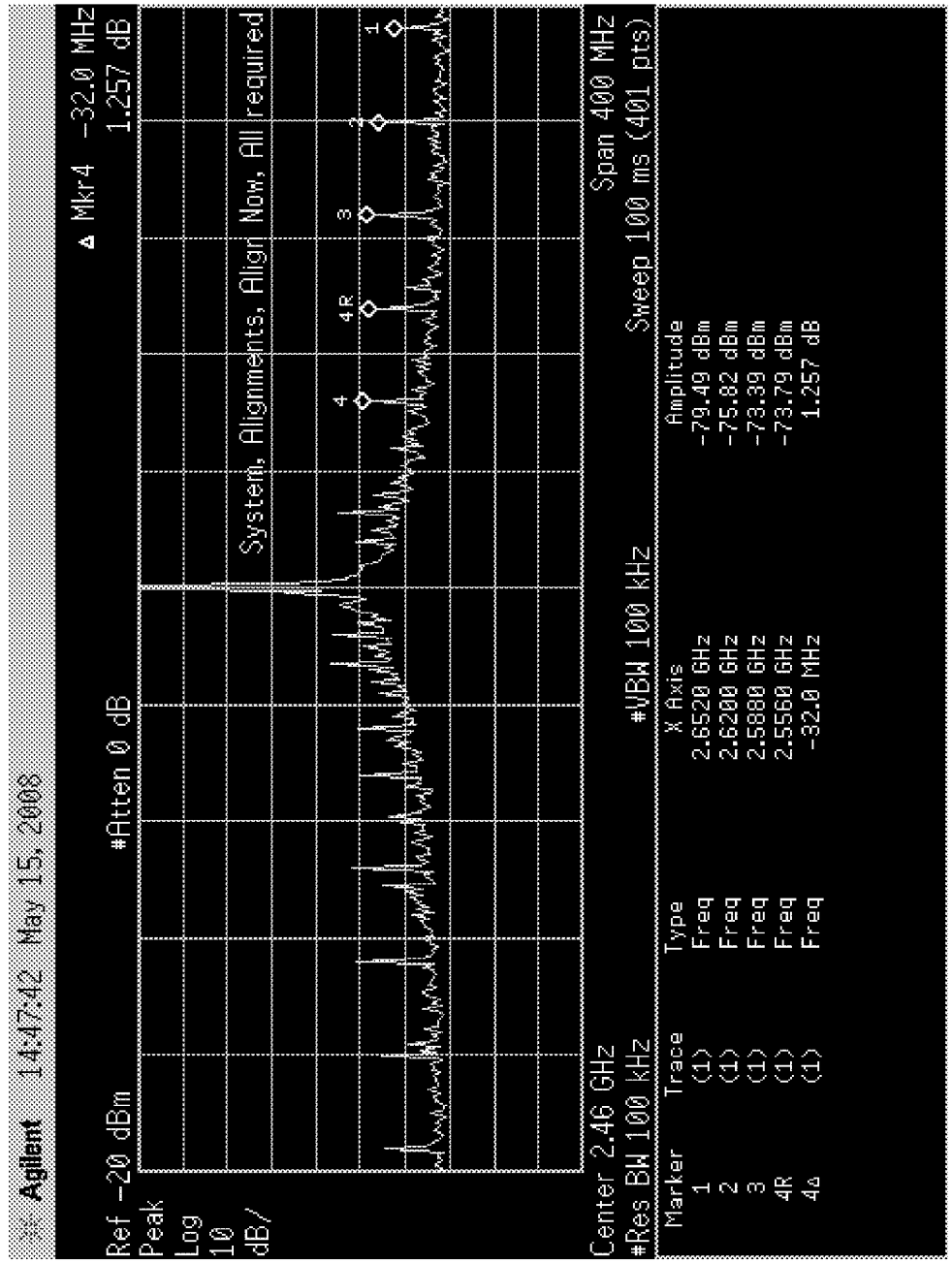
FIG. 3 is a screen capture of a Bluetooth transmission spectrum, according to some embodiments.

FIG. 3 shows a Bluetooth transmission spectrum capture 50 from one of the top-selling Bluetooth chips currently available. The Bluetooth chip is transmitting at a fixed frequency of 2460 MHz (with frequency hopping turned off). The Bluetooth chip has a 32 MHz internal clock.

The span 50 of FIG. 3 captures 400 MHz of data, with each vertical line in the graph denoting a 40 MHz increment. The Bluetooth radio's transmission frequency ($F_1$) and its internal narrow band low frequency clock ($F_2$) are coupled together to form several transmission spurs at ($F_1-2F_2$), ($F_1-F_2$), ($F_1+F_2$), ($F_1+2F_2$), also referred to as the inter-modulation frequency components, with the spurs being 32 MHz apart. The 2460 MHz signal is getting mixed with the 32 MHz signal of the Bluetooth clock. Markers indicate the location of the spurs, and the frequency and amplitude of each spur is indicated at the bottom of the graph 50.

The screen capture 50 of FIG. 3 is representative of the characteristics of a Bluetooth device. A Bluetooth transmitter having a low-cost design may have an inexpensive mixer and/or inexpensive front-end module. Thus, inter-modulation of the operating frequency of the Bluetooth transmitter 20 with its own clock 30 may cause the spurs shown in FIG. 3.

A Bluetooth radio transmitter typically utilizes frequency hopping to help overcome the channel interference. The radio uses one frequency (with a 1 MHz bandwidth) at a time for one packet using a selected modulation scheme (e.g., DM1, DM3, DH1, DH3). The Bluetooth radio then hops to another frequency for the next packet, based on a pre-negotiated frequency-hopping pattern that is also known to the receiver. The available hopping channels are from 2402 MHz to 2480 MHz, a total of 79 channels.

If inter-modulation exists, each transmission will have a spur pattern similar to the one shown in FIG. 3. As a result, both the main transmission frequency ($F_1$) and all its inter-modulated spurs ($F_1 \pm kF_2$) over the time period will hold a set of transmission patterns overlapping each other.

Figure 4:
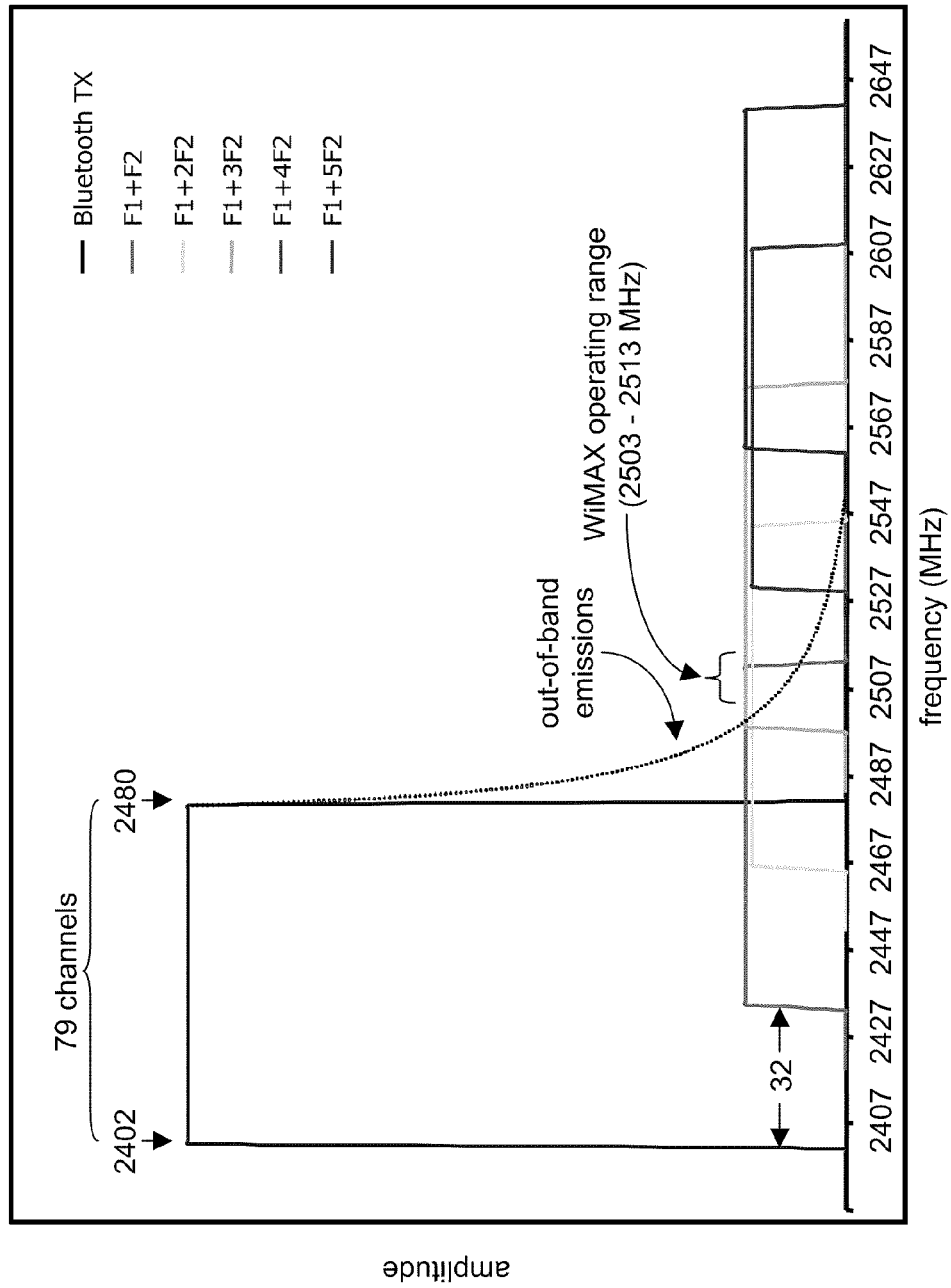
FIG. 4 is a graph depicting a Bluetooth transmission spectrum, along with several inter-modulation transmission spurs and out-of-band emissions, according to some embodiments.

FIG. 4 is a graph 60 illustrating the transmission spurs in another way. The graph 60 measures frequency (x axis) versus amplitude (y axis). The Bluetooth radio transmitter 20 transmits over any one of 79 channels, starting at 2402 MHz and ending at 2480 MHz. A first transmission spur is depicted at 2434 MHz (pink), a second one at 2466 MHz (yellow), a third one at 2498 MHz (blue), a fourth one at 2530 MHz (purple), and a fifth one at 2562 MHz (brown). Like the square wave from which they are derived, each transmission spur is 79 (1 MHz) channels wide. Table 1 shows what is depicted in FIG. 4 in detail.

TABLE 1

Bluetooth transmission with spurs

| signal | formula | channel begin | channel end | color |
|---|---|---|---|---|
| Bluetooth | $F_1$ | 2402 MHz | 2480 MHz | black |
| 1st spur | $F_1 + F_2$ | 2434 MHz | 2513 MHz | pink |
| 2nd spur | $F_1 + 2F_2$ | 2466 MHz | 2545 MHz | yellow |
| 3rd spur | $F_1 + 3F_2$ | 2498 MHz | 2577 MHz | blue |
| 4th spur | $F_1 + 4F_2$ | 2530 MHz | 2609 MHz | purple |
| 5th spur | $F_1 + 5F_2$ | 2562 MHz | 2641 MHz | brown |

Out-of-band emission is also shown in FIG. 4. Both out-of-band (OOB) emission and inter-modulation (the spurs) raise the noise floor. The OOB emission gradually flattens out when it moves away from the transmitting frequency. At some point (about 2497 MHz in this example), the inter-modulation spurs become dominant, as the out-of-band emissions drop below the inter-modulation energy level.

Figure 5:
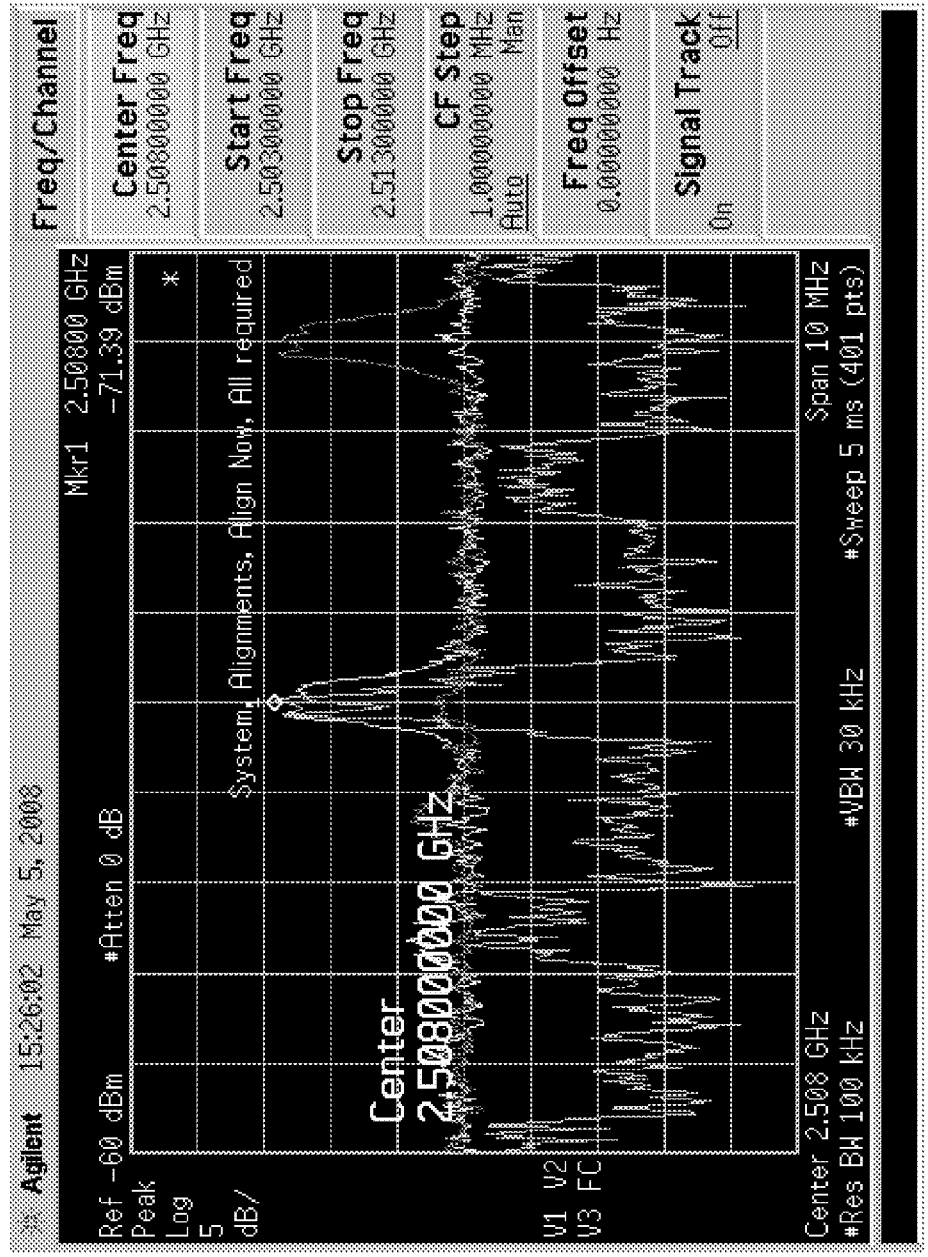
FIG. 5 is a 10 MHz spectrum capture of a WiMAX transmitter collocated with a Bluetooth transmitter transmitting at 2444 and 2448 MHz, according to some embodiments.

FIG. 5 shows a 10 MHz spectrum capture at 2508±5 MHz (the operating frequency of the WiMAX receiver 40), with a Bluetooth transmitter at 2444 MHz. The transmissions are at −71 dBm (inter-modulation), −85 dBM (out-of-band), and −96 dBm (thermal). The blue curve indicates a 5 ms one-shot capture with the Bluetooth radio transmitter operating at 2444 MHz (which is 64 MHz away from 2508 MHz, the WiMAX receiver's operating frequency). Within 5 ms, the Bluetooth transmitter and receiver alternate, and each one lasts for one Bluetooth slot (625 µs). The inter-modulation spur only happens at the transmission time, and when the Bluetooth transmitter is not active, the noise floor becomes −96 dBm.

A yellow curve is the maximum hold curve with the Bluetooth radio transmitter operating at 2444 MHz. There is a −71.39 dBm inter-modulation spur at 2508 MHz and for the remaining 9 MHz, the noise floor is −85 dBm, governed by the transmitter out-of-band emission level. A pink curve denotes the maximum hold curve with a Bluetooth radio transmitter at 2448 MHz (4 MHz to the right of the previous 2444 MHz). The spur also shifts 4 MHz to the right of 2512 MHz, indicating that the spur is caused by inter-modulation.

Figure 6:
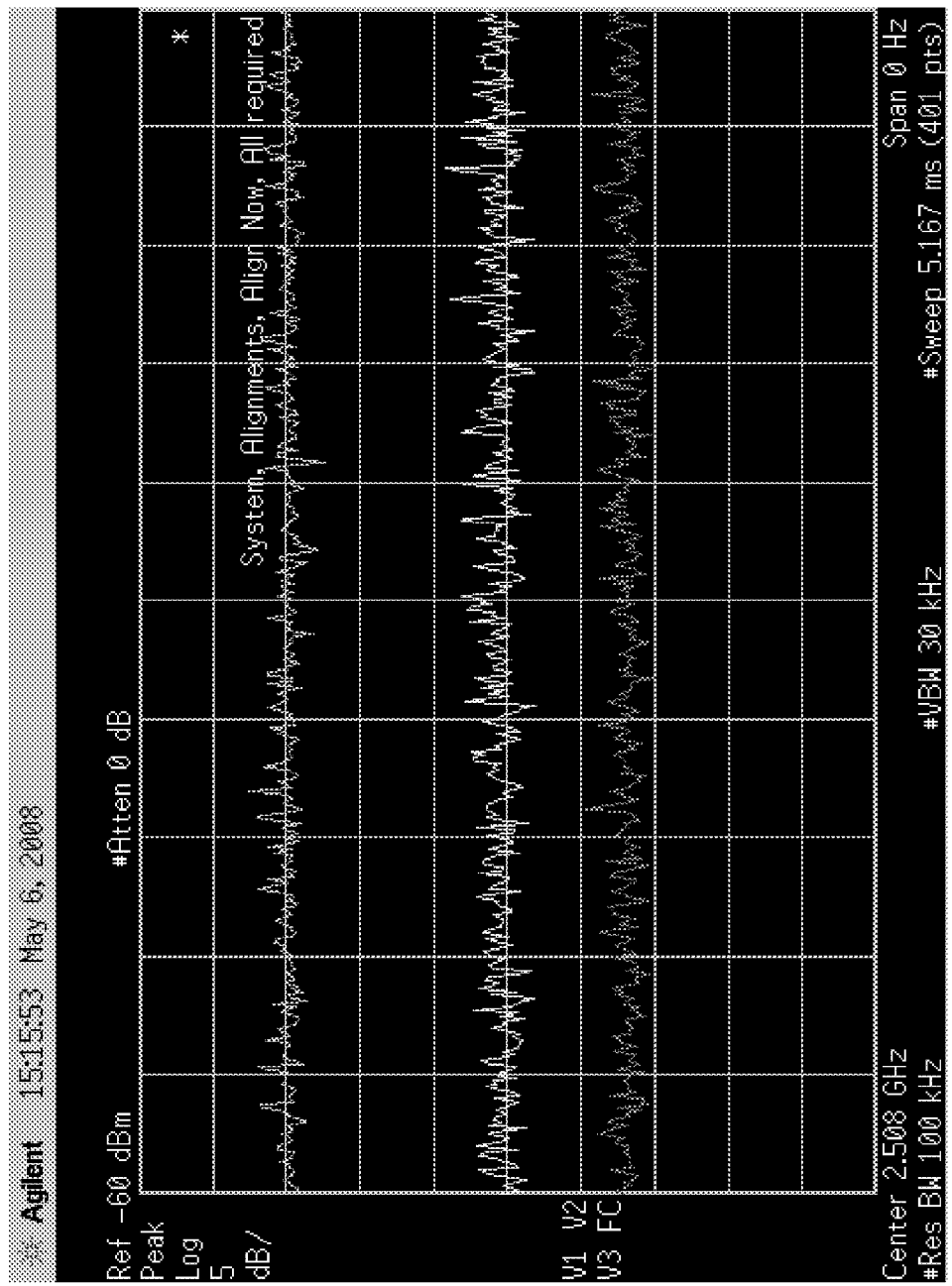
FIG. 6 is a noise floor capture at the WiMAX center frequency (2508 MHz) and the noise of a Bluetooth transmitter showing the effects of channel selection, according to some embodiments.

FIG. 6 is another closer look at 2508 MHz in "zero span maximum hold" mode, which essentially shows the flat noise floor right on 2508 MHz, while Bluetooth is running a real voice application. A blue curve is obtained when the Bluetooth transmitter is hopping between 2402-2421 MHz (the left-most twenty channels of the 79 depicted in FIG. 3). The Bluetooth transmitter has a 32 MHz internal clock coupled into one of the operating frequencies, so that the noise floor gets raised to −70 dBm.

A yellow curve is obtained when the Bluetooth transmitter is hopping between 2402-2422 MHz, but not at 2412 MHz, which is 96 MHz away from 2508 MHz. So, after selecting the same twenty channels, the one that is a multiple of 32 channels away from 2508 MHz (the WiMAX operating frequency), or 2412 MHz, is removed from the channel selection. Thus, another channel is added at the end of the range (2422 MHz) so that there remains a total of twenty available channels.

FIG. 6 shows that, by just swapping out the problematic frequency (2412 MHz), there is almost a 14 dB noise floor reduction (−70 dBm→84 dBm). The pink curve in FIG. 6 is the one without Bluetooth transmitter operation, which shows the thermal noise floor. FIG. 6 also shows at the 2508 MHz WiMAX frequency that the left-most 20 MHz Bluetooth transmitter's out-of-band emission brings approximately 8 dB and the inter-modulation spur brings approximately 23 dB on top of the thermal noise floor.

A typical WiMAX subscriber would experience −80 dBm received signal strength indication (RSSI) or below. To obtain a qualified signal-to-noise ratio, the noise floor cannot be too high. Due to the design constraint, it is often hard to achieve greater than 25 dB Bluetooth transmitter/WiMAX antenna isolation, especially on an ultra mobile device. FIG. 6 shows that by avoiding the Bluetooth transmitter's inter-modulation spur, the noise floor can be lowered to the normal transmitter out-of-band level. A 15 dB noise floor improvement in this example is similar to reducing the physical distance between the Bluetooth transmitter and WiMAX antennas by several decibels.

Bluetooth has the flexibility to selectively hop within 79 channels, and the Bluetooth specification states that the minimal requirement is only twenty channels. This means that a Bluetooth device can operate in as few as twenty channels, without sacrificing its performance. However, Bluetooth does not opt out a channel unless it detects a high bit error rate in that channel (Adaptive Frequency Hopping, AFH), or is specifically requested by the Bluetooth transmitter-WiFi coexistence protocol. AFH and Bluetooth-WiFi coexistence protocols are intended to solve in-channel interference (Bluetooth and WiFi operate in the same ISM (Industry Scientific and Medical) band, so they interfere with each other.) Neither of these operations address the transmitter spurs caused by inter-modulation, such as in this Bluetooth-to-WiMAX interference scenario. The FSE 200 is designed to address out-of-channel interference. The WiMAX-to-Bluetooth or Bluetooth-to-WiMAX configurations described herein are out-of-channel interference situations (one operates in the 2.4 GHz spectrum and the other operates in the 2.5 or 2.3 GHz spectrum), which may not be detected by a "high bit error rate", in particular, the Bluetooth channel, or by the existing Bluetooth-WiFi coexistence protocol.

In some embodiments, the frequency selection engine 200 takes advantage of Bluetooth's channel hopping characteristics to remove a subset of frequencies from the Bluetooth operating channels. In doing this, the inter-modulation spurs do not fall into the WiMAX operation channel. FIG. 6 illustrates how removing a single channel from a 20-channel subset of frequencies can have a significant benefit. Rather than blindly removing frequencies close to the WiMAX operating frequencies due to out-of-band transmissions, the FSE 200 intelligently removes the inter-modulation channels. As has been shown in FIG. 6, above, the FSE 200 may replace a channel that is farther away (from the WiMAX operating frequency), but which is problematic with one that is nearer to the WiMAX operating frequency because it is safer. The traditional approach of increasing the frequency spacing between the two co-located devices is not used; instead, the FSE 200 intelligently removes channels so as to get better results.

Using the algorithm depicted in FIG. 2 (or the simpler algorithm of FIGS. 8A and 8B, as described below), the FSE 200 chooses appropriate operating channels for the Bluetooth radios based on the frequencies characteristics of the WiMAX radio and the Bluetooth clock signal, which are easy to obtain, since they are collocated in the same physical device. The actual hardware architecture or mechanisms to obtain this information and to control Bluetooth radio operation are out the scope of this disclosure.

Returning to the previous example of the 10 MHz WiMAX radio receiver operating at 2508 MHz, FIG. 4 shows that the WiMAX receiver's channel would overlap with a Bluetooth radio transmitter's first (pink), second (yellow), and third (blue) inter-modulation spurs. In order to completely remove the WiMAX channel spurs, in some embodiments, the Bluetooth transmitter removes three different chunks of frequencies from its 79 channels, as illustrated in FIGS. 7 and 8.

Figure 7:
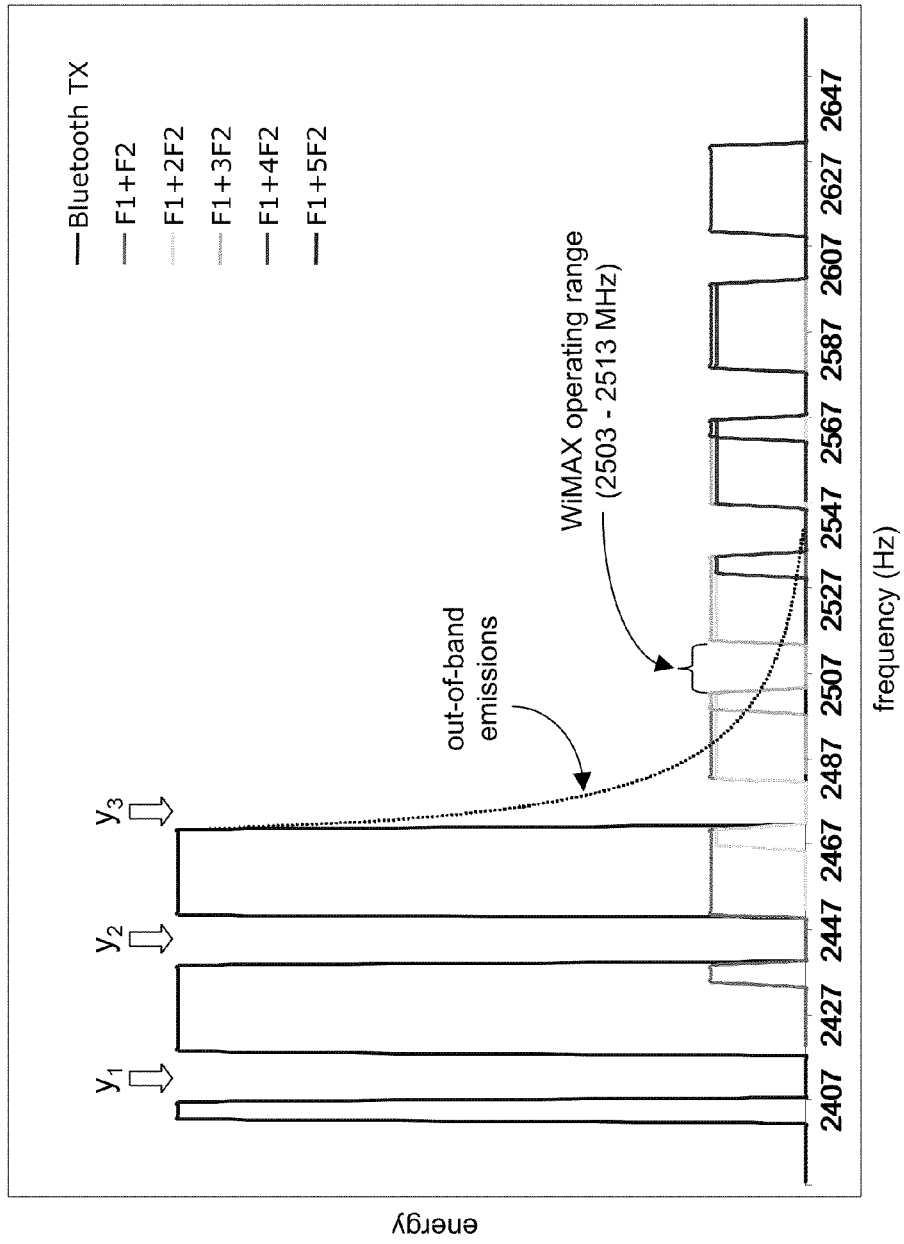
FIG. 7 is a graph depicting a Bluetooth transmission spectrum, with three portions of the spectrum removed by the frequency selection engine, according to some embodiments.
Figure 8A:
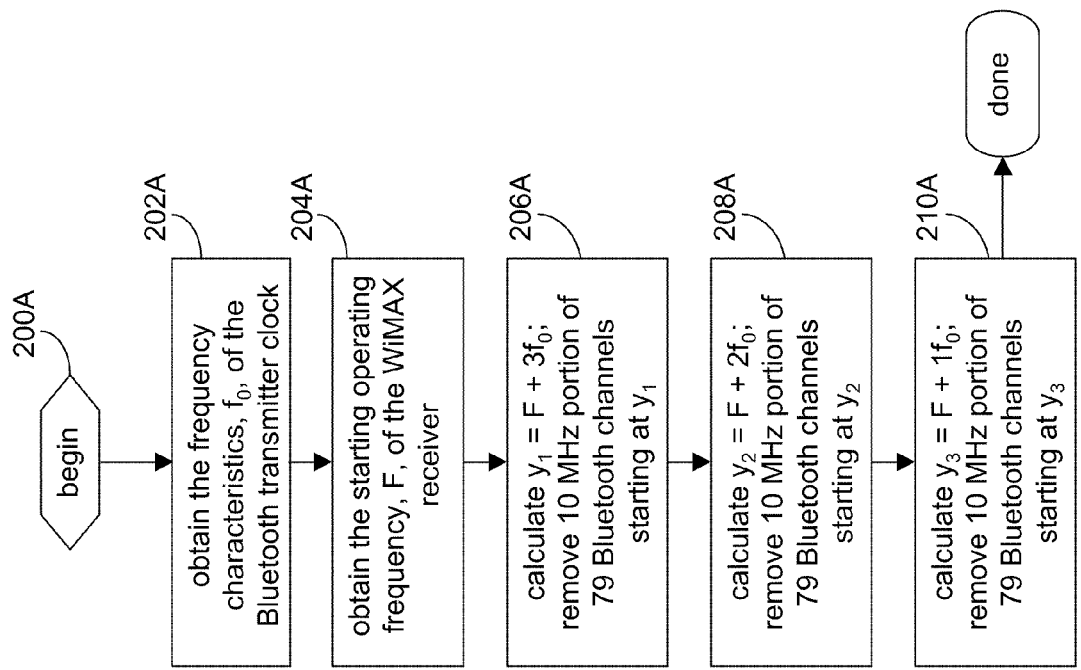
FIGS. 8A and 8B are flow diagrams showing the operations performed by the frequency selection engine to enable a collocated Bluetooth transmitter and a WiMAX receiver to operate without interference, according to some embodiments.
Figure 8B:
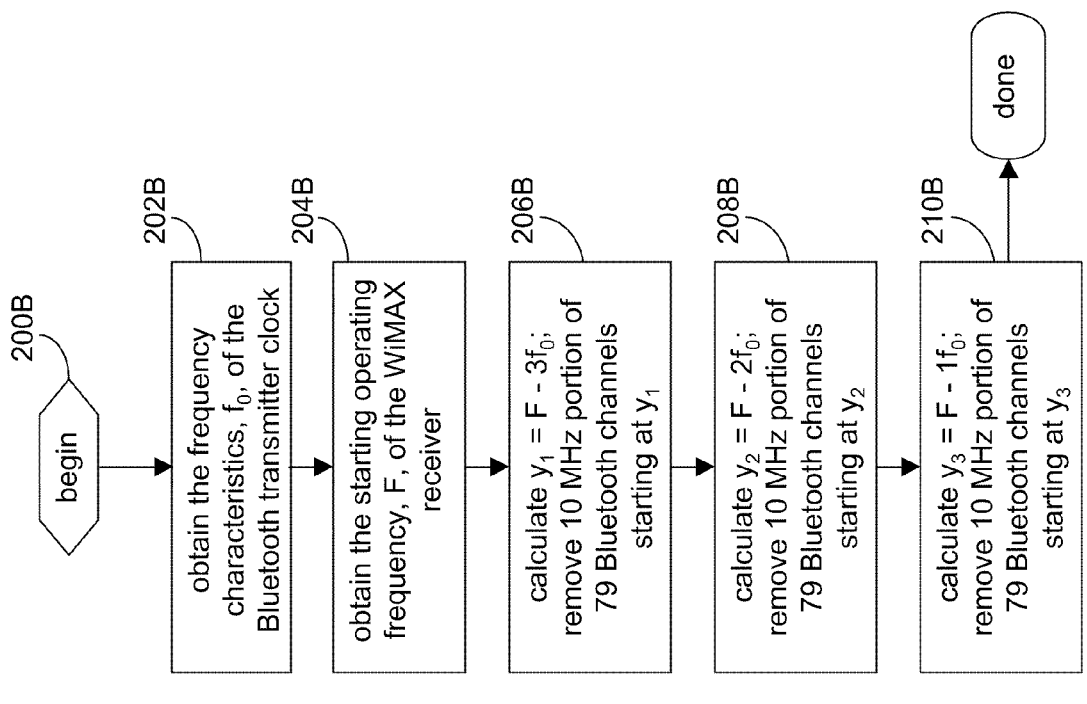

FIG. 7 is a graph 90 showing visually how the FSE 200 is eliminating three different portions of the 79-channel Bluetooth transmission spectrum. FIGS. 8A and 8B are flow diagrams that illustrates the FSE 200 operationally. For the Bluetooth transmitter 20 and the WiMAX receiver 40 of FIG. 1, the operations of FIGS. 2 and 8A or 8B generate the same results. However, FIGS. 8A and 8B present two simplified methods for dividing up the available Bluetooth frequencies, given the characteristics described in FIGS. 3-6.

The first two operations of FIG. 8A are essentially the same as given in FIG. 2. The frequency selection engine 200 obtains the frequency, $f_0$, of the Bluetooth transmitter clock 30 (block 202A) and the starting frequency of the WiMAX receiver 40 (block 204A). (The Bluetooth clock bandwidth, $b_0$, is 1 MHz and the WiMAX bandwidth, B, is 10 MHz.) From this, the FSE 200 performs three calculations, denoted $y_1$, $y_2$, and $y_3$, with $y_1 = F + 3f_0$ (block 206A), $y_2 = F + 2f_0$ (block 208A), and $y_3 = F + 1f_0$ (block 210A). The operations are a close approximation of the calculations in equation 2a, above. Similarly, for FIG. 8B, the frequency selection engine 200 obtains the frequency, $f_0$, of the Bluetooth transmitter clock 30 (block 202B) and the starting frequency of the WiMAX receiver 40 (block 204B). (The Bluetooth clock bandwidth, $b_0$, is 1 MHz and the WiMAX bandwidth, B, is 10 MHz.) From this, the FSE 200 performs three calculations, denoted $y_1$, $y_2$, and $y_3$, with $y_1 = F - 3f_0$ (block 206B), $y_2 = F - 2f_0$ (block 208B), and $y_3 = F - 1f_0$ (block 210B). The operations are a close approximation of the calculations in equation 2b, above.

As illustrated in FIG. 7, three separate 10 MHz portions of the 79-channel Bluetooth transmission spectrum are eliminated as unavailable to the Bluetooth transmitter. Table 2 shows the entire 79-channel Bluetooth spectrum, with the three portions shown as unavailable to the Bluetooth transmitter 20.

TABLE 2

Bluetooth spectrum after FSE 200 operation

| channel range | available to Bluetooth? | # of channels |
|---|---|---|
| 2402-2406 | yes | 5 |
| 2407-2416 | no | 10 |
| 2417-2438 | yes | 22 |
| 2439-2448 | no | 10 |
| 2449-2470 | yes | 22 |
| 2471-2480 | no | 10 |

As FIG. 7 and Table 2 reveal, the Bluetooth transmitter 20 has 49 channels to choose from, despite the three 10 MHz exclusions. Thus, the Bluetooth transmitter 20 may operate without limitation. The "holes" in the 79-channel transmission spectrum are replicated in the transmission spurs, as shown in FIG. 7, such that, at the transmission frequencies 2503 MHz-2513 MHz, there are no spurs. Thus, the WiMAX receiver 40 is able to use its 10 MHz spectrum without inter-modulation noise. The width of the excluded channels is 10 MHz, which is due to the WiMAX bandwidth, B, being 10 MHz. However, equation 2 is generalized for other victim receiver bandwidths. For example, WiMAX operates in some countries at a bandwidth of 5 MHz, which would change the results somewhat. Nevertheless, equation 2 may be used to calculate the valid transmitter bandwidths for operating with a collocated receiver.

Figure 9:
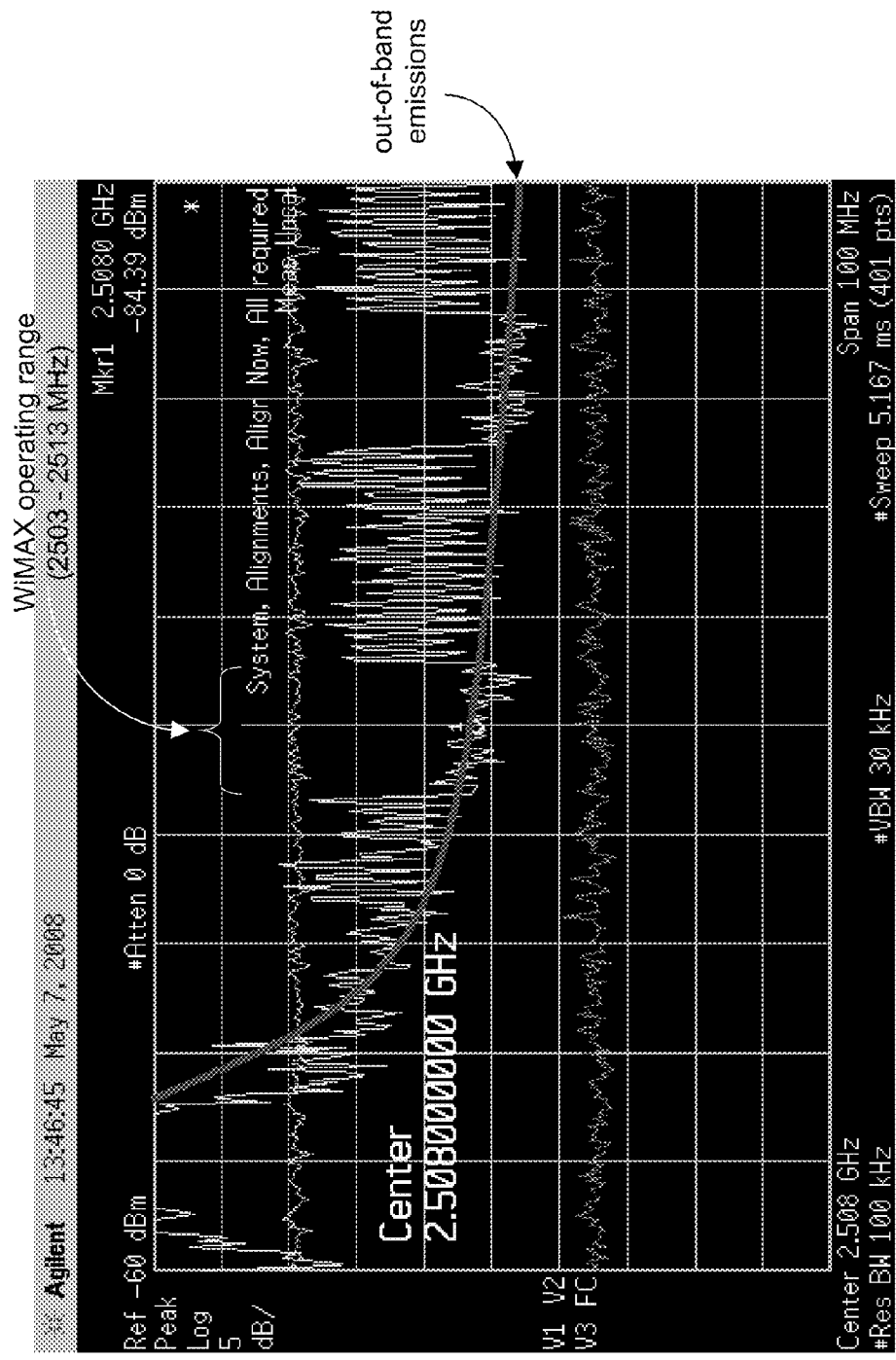
FIG. 9 is a screen capture of the frequency selection engine in operation, according to some embodiments.

FIG. 9 is a live spectrum capture at 2508±50 MHz, while the Bluetooth transmitter is running a hands-free profile. The Bluetooth transmitter is configured to remove 30 channels out of its 79 available channels, as illustrated in FIG. 7. As a result, as indicated by the yellow curve in FIG. 9, the FSE 200 removes transmitter inter-modulation spurs around 2508 MHz and reduces the noise floor by 10 dB to an out-of-band emission level (highlighted by the red line). The pink line is the baseline of the thermal noise floor when the Bluetooth transmitter is not transmitting.

The FSE 200 provides a simple solution to remove the transmitter inter-modulation spurs due to clock harmonics. The method improves sensitivity of a receiver in the presence of co-interference by reducing the collocated radio transmitter's noise floor to the transmitter out-of-band emission level. Compared to the existing media access controller (MAC) coordination-based approach, the FSE 200 helps to alleviate the inter-radio isolation requirement, to achieve true concurrency.

The FSE 200 is novel in the way that operation frequencies or channels are explicitly controlled according to the frequency characteristics of other collocated receivers and the local clock, so that the transmitter spurs are shifted over the spectrum to minimize the impact of inter-modulation. Infringement may be detected if the transmitter inter-modulation spurs change along with the operation frequency and the bandwidth of another collocated receiver (e.g., WiMAX) on the same platform.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A system comprising:
a receiver operating at a predetermined frequency, starting at F, and bandwidth, B;
a transmitter/receiver operating within a predetermined range of frequencies, the transmitter/receiver comprising an internal clock running at a clock frequency, $f_0$ and bandwidth, $b_0$; and
a frequency selection engine to select a range of operating frequencies of the transmitter/receiver within the predetermined range, the frequency selection engine to select a plurality of operating frequency ranges using ether of the following equations:

$$\{x < F + f_0\}, \{F + B + (k-1)f_0 + b_0 < x < F + kf_0, (k > 1)\}, \text{ or}$$

$$\{F + B - kf_0 < x < F - b_0 - (k-1)f_0, (k > 1)\}, \{F + B - f_0 < x\},$$

wherein k is an integer and x indicates either an operating frequency or a range of operating frequencies of the transmitter/receiver; wherein the receiver does not experience transmission spurs of the transmitter/receiver due to inter-modulation.

2. The system of claim 1, wherein the receiver is a WiMAX receiver.

3. The system of claim 2, wherein B is 10 MHz.

4. The system of claim 3, wherein the WiMAX receiver operates between 2503 MHz and 2513 MHZ.

5. The system of claim 1, wherein the transmitter/receiver is a Bluetooth device operating at a 1 MHz bandwidth.

6. The system of claim 5, wherein the Bluetooth transmitter/receiver performs frequency hopping.

7. The system of claim 5, wherein and the predetermined range of frequencies is between 2402 MHz and 2480 MHz.

8. A method implemented in a frequency selection engine, comprising:

obtaining a desired operating frequency and bandwidth of a receiver;

obtaining a clock frequency of a frequency hopping spread spectrum radio transmitter, wherein the frequency hopping spread spectrum transmitter operates over a single channel at a time of a multiple-channel transmission spectrum;

either adding or subtracting the clock frequency from the desired operating frequency to generate a first frequency;

either adding or subtracting twice the clock frequency from the desired operating frequency to generate a second frequency;

either adding or subtracting three times the clock frequency from the desired operating frequency to generate a third frequency; and programming the frequency hopping spread spectrum radio transmitter to not operate in the following operating ranges:

the first frequency through the first frequency plus the bandwidth;

the second frequency through the second frequency plus the bandwidth; and the third frequency through the third frequency plus the bandwidth.

9. The method of claim 8, obtaining a desired operating frequency and bandwidth of a receiver further comprising:

obtaining a desired operating frequency and bandwidth of a victim receiver.

10. The method of claim 9, obtaining a desired operating frequency and bandwidth of a victim receiver further comprising:

obtaining a desired operating frequency and a bandwidth of a WiMAX receiver.

11. The method of claim 9, obtaining a desired operating frequency and a bandwidth of a WiMAX receiver further comprising:

obtaining a desired operating frequency of 2508 MHz and a bandwidth of 10 MHz.

12. The method of claim 8, obtaining a clock frequency of a frequency hopping spread spectrum radio transmitter further comprising:

obtaining a clock frequency of a Bluetooth radio transmitter.

13. A system comprising:

a victim receiver operating at a predetermined frequency, F, and bandwidth, B;

a transmitter/receiver operating within a predetermined range of frequencies, the transmitter/receiver comprising an internal clock running at a clock frequency, $f_0$; and a frequency selection engine to select a range of operating frequencies of the transmitter/receiver within the predetermined range, the frequency selection engine to:

select a first operating frequency range of $F \pm f_0$ through $F \pm f_0 + B$;

select a second operating frequency range of $F \pm 2f_0$ through $F \pm 2f_0 + B$;

select a third operating frequency range of $F \pm 3f_0$ through $F \pm 3f_0 + B$;

wherein the victim receiver does not experience transmission spurs of the transmitter/receiver due to inter-modulation.

14. The system of claim 13, wherein the victim receiver is a WiMAX receiver.

15. The system of claim 14, wherein the WiMAX receiver operates between 2503 MHz and 2513 MHz.

16. The system of claim 13, wherein the transmitter/receiver is a fixed operating frequency device with a wide range of operating frequencies.

17. The system of claim 13, wherein the transmitter/receiver performs frequency hopping.

18. The system of claim 13, wherein the transmitter/receiver is a Bluetooth transmitter/receiver.

19. The system of claim 13, wherein the first, second, and third operating frequency ranges are adjusted to conform with the operating frequency range of the transmitter/receiver.

* * * * *

UNITED STATES PATENT AND TRADEMARK OFFICE
CERTIFICATE OF CORRECTION

PATENT NO. : 8,290,020 B2
APPLICATION NO. : 12/485833
DATED : October 16, 2012
INVENTOR(S) : Hsin-Yuo Liu et al.

It is certified that error appears in the above-identified patent and that said Letters Patent is hereby corrected as shown below:

On the Title page, in field (56), in column 2, under "Other Publications", line 2, delete "Appliaction" and insert -- Application --, therefor.

In column 8, line 44, in claim 1, delete "ether" and insert -- either --, therefor.

In column 8, line 64, in claim 7, after "wherein" delete "and".

Signed and Sealed this
Nineteenth Day of February, 2013

Teresa Stanek Rea
*Acting Director of the United States Patent and Trademark Office*